(12) United States Patent
Tsuchida et al.

(10) Patent No.: US 11,370,294 B2
(45) Date of Patent: Jun. 28, 2022

(54) GRILLE SHUTTER

(71) Applicants: Toyota Jidosha Kabushiki Kaisha, Toyota (JP); Aisin Seiki Kabushiki Kaisha, Kariya (JP)

(72) Inventors: Tamotsu Tsuchida, Toyota (JP); Shun Totsuka, Miyoshi (JP); Ken Komatsubara, Nagoya (JP); Kazuki Tsuboi, Kariya (JP)

(73) Assignees: TOYOTA JIDOSHA KABUSHIKI KAISHA, Toyota (JP); AISIN SEIKI KABUSHIKI KAISHA, Kariya (JP)

( * ) Notice: Subject to any disclaimer, the term of this patent is extended or adjusted under 35 U.S.C. 154(b) by 203 days.

(21) Appl. No.: 16/682,432

(22) Filed: Nov. 13, 2019

(65) Prior Publication Data

US 2020/0156462 A1 May 21, 2020

(30) Foreign Application Priority Data

Nov. 16, 2018 (JP) .............................. JP2018-215355

(51) Int. Cl.
*B60K 11/08* (2006.01)
*B60R 19/52* (2006.01)

(52) U.S. Cl.
CPC .............. *B60K 11/08* (2013.01); *B60R 19/52* (2013.01)

(58) Field of Classification Search
CPC . B60R 19/52; B60R 19/18; B60R 2019/1806; B60K 11/08
See application file for complete search history.

(56) References Cited

U.S. PATENT DOCUMENTS 8,821,224 B2 * 9/2014 Alexander ................. B60J 9/04
454/70

FOREIGN PATENT DOCUMENTS

| DE | 202013007805 U1 | 12/2014 |
| JP | H1134771 A | 2/1999 |
| JP | 2007-001503 A | 1/2007 |

* cited by examiner

*Primary Examiner* — D Glenn Dayoan
*Assistant Examiner* — Melissa Ann Bonifazi
(74) *Attorney, Agent, or Firm* — Dinsmore & Shohl LLP (57) ABSTRACT

A grille shutter includes a frame, a fin supported by the frame, and brackets that are arranged respectively on opposite sides of the frame in the vehicle right-left direction and used for attaching the frame to a vehicle body. Each of the brackets is partially provided with a fragile portion.

20 Claims, 6 Drawing Sheets

GRILLE SHUTTER

CROSS-REFERENCE TO RELATED APPLICATIONS

This application claims priority to Japanese Patent Application No. 2018-215355 filed on Nov. 16, 2018, which is incorporated herein by reference in its entirety including the specification, drawings and abstract.

BACKGROUND

1. Technical Field

The disclosure relates to a grille shutter of a vehicle.

2. Description of Related Art

Japanese Unexamined Patent Application Publication No. 2007-001503 (JP 2007-001503 A) discloses a technique in which a bellows-shaped flexible connecting part is provided between a front bumper and a grille shutter, and deformation of the front bumper is absorbed by the flexible connecting part at the time of vehicle collision. Thus, damage of the grille shutter is restrained.

However, the foregoing grille shutter has room for improvement in terms of the following: the bellows-shaped flexible connecting part is provided in a vehicle front-rear direction on the assumption of frontal collision of the vehicle. Therefore, for an impact load that can be generated from a vehicle lower direction when the vehicle travels on a bad road, the flexible connecting part may not be able to sufficiently absorb the impact. As a result, there is a possibility that the grille shutter can be damaged due to the impact load from the vehicle lower direction, and the grille shutter can fall down from a vehicle body to which the grille shutter is attached.

SUMMARY

The disclosure provides a grille shutter having a compact structure, the grille shutter being attached to a vehicle body and restrained from falling down from the vehicle body when an impact load is applied from a vehicle lower direction.

A first aspect of the disclosure is a grille shutter. The grille shutter includes a frame, a fin supported by the frame, and brackets that are arranged respectively on opposite sides of the flame in a vehicle right-left direction, and used for attaching the frame to a vehicle body. Each of the brackets is partially provided with a fragile portion.

According to the first aspect, since the fragile portion is provided in a part of the bracket, the fragile portion is plastically deformed (including damaged) when an impact load from a vehicle lower direction is applied to the bracket while, for example, a vehicle is traveling on a bad road. Thus, at least a part of the impact can be absorbed. Therefore, the impact to a joining portion of the bracket to the vehicle body is alleviated, and it is thus possible to restrain damage of the joining portion. As a result, the joining state of the bracket to the vehicle body is maintained, and the grille shutter is restrained from falling from the vehicle body. Further, since the joining state of the bracket to the vehicle body is maintained only with the fragile portion being provided in the bracket, it is possible to maintain the joining state of the bracket to the vehicle body with a compact structure.

In the first aspect, the fragile portion may be provided in a middle portion of a corresponding bracket in a vehicle upper-lower direction. The bracket may include the joining portion that is joined to the vehicle body. The joining portion may include an upper joining portion provided above the fragile portion, and a lower joining portion provided below the fragile portion.

With the foregoing configuration, since the fragile portion is present between the upper joining portion and the lower joining portion in the vehicle upper-lower direction, when an impact load is applied from the vehicle lower direction while, for example, the vehicle is traveling on a bad road, the impact acts directly on the lower joining portion, and there is a possibility that the lower joining portion can be damaged. However, the upper joining portion is restrained from being damaged because the impact applied to the upper joining portion is alleviated as the fragile portion is plastically deformed. Therefore, the joining state of the upper joining portion to the vehicle body is maintained, and it is thus possible to restrain the grille shutter from falling down from the vehicle body.

In the first aspect, the upper joining portion and the lower joining portion may be provided in a rear-side end portion of the corresponding bracket in the vehicle front-rear direction, and the fragile portion may be provided continuously from a middle portion through a front-side end of the corresponding bracket in the vehicle front-rear direction.

In the foregoing configuration, the upper joining portion and the lower joining portion are provided in the rear-side end portion of the bracket in the vehicle front-rear direction, and the fragile portion may be provided continuously from the middle portion through the front-side end of the bracket in the vehicle front-rear direction. Therefore, with the foregoing configuration, first of all, the fragile portion can be plastically deformed in a location away from the upper joining portion and the lower joining portion. Secondly, compared to a case where the fragile portion is provided only in the middle portion of the bracket in the vehicle front-rear direction, the fragile portion can be plastically deformed more easily when an impact load from the vehicle lower direction is applied to the bracket. Thirdly, compared to a case where the fragile portion is provided continuously in an entire region of the bracket in the vehicle front-rear direction, it is possible to restrain rigidity of the bracket from becoming too low due to the fragile portion being provided. Therefore, plastic deformation of the fragile portion is restrained when there is no impact load applied to the bracket from the vehicle lower direction while a vehicle is traveling normally. Fourthly, when an impact load is applied from the vehicle lower direction, the bracket can be deformed in a mode in which the bracket is broken in a way that the front-side end of the bracket in the vehicle front-rear direction is lifted up. Therefore, it is possible to efficiently alleviate an impact applied to the upper joining portion, and damage of the upper joining portion is efficiently restrained.

In the first aspect, a rear-side end of the fragile portion in the vehicle front-rear direction may be positioned rearward of a center of the corresponding bracket in the vehicle front-rear direction.

With the foregoing configuration, since the rear-side end of the fragile portion in the vehicle front-rear direction is positioned on the vehicle rearward of the center of the bracket in the vehicle front-rear direction, compared to a case where the rear-side end of the fragile portion is positioned in the center of the bracket in the vehicle front-rear direction or on the vehicle forward of the center, it is possible to make the fragile portion longer in the vehicle front-rear direction. Thus, when an impact load is applied to the front-side end of the fragile portion from the vehicle lower direction, it is possible to increase the moment generated in the front-side end of the fragile portion about the rear-side end of the fragile portion. Thus, when an impact load is applied from the vehicle lower direction, it is possible to efficiently obtain a deformation mode of the bracket in which the bracket is broken in a way that the front-side end of the bracket is lifted up.

In the first aspect, the fragile portion may include a widened portion in which a length in the vehicle upper-lower direction increases towards a front side in the vehicle front-rear direction. The widened portion may be provided by including the front-side end of the fragile portion in the vehicle front-rear direction.

With the foregoing configuration, the fragile portion includes the widened portion. Therefore, when an impact load is applied from the vehicle lower direction, it is possible to efficiently obtain a deformation mode of the bracket in which the bracket is broken in a way that the front-side end of the bracket is lifted up.

In the first aspect, each of the brackets may be provided with a normal portion, and a thickness of the fragile portion may be smaller than a thickness of the normal portion.

With the foregoing configuration, the thickness of the fragile portion is smaller than the thickness of the normal portion. Therefore, it is possible to form the fragile portion with a simple configuration.

In the first aspect, each of the bracket may be formed integrally with the frame.

With the foregoing configuration, since each of the brackets is formed integrally with the frame, cost may be reduced as the number of components becomes smaller than that in a case where each of the bracket is formed separately from the frame.

In the first aspect, each of the brackets may be provided with a normal portion, and the fragile portion may have lower strength in a vehicle upper-lower direction compared to strength of the normal portion.

In the first aspect, each of the brackets may include a joining portion that is joined to the vehicle body, and the joining portion may be provided above the fragile portion.

In the first aspect, each of the brackets may be provided with a normal portion, and a material used for the fragile portion may have lower strength in a vehicle upper-lower direction than strength of a material used for the normal portion.

In the first aspect, the fragile portion may be configured so as to be plastically deformed when an impact is applied from below in a vehicle upper-lower direction.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, a grille shutter according to an example of the disclosure is described with reference to the drawings. In the drawings, FR represents a front side in a vehicle front-rear direction, and UP represents an upper side in a vehicle upper-lower direction.

Figure 6:
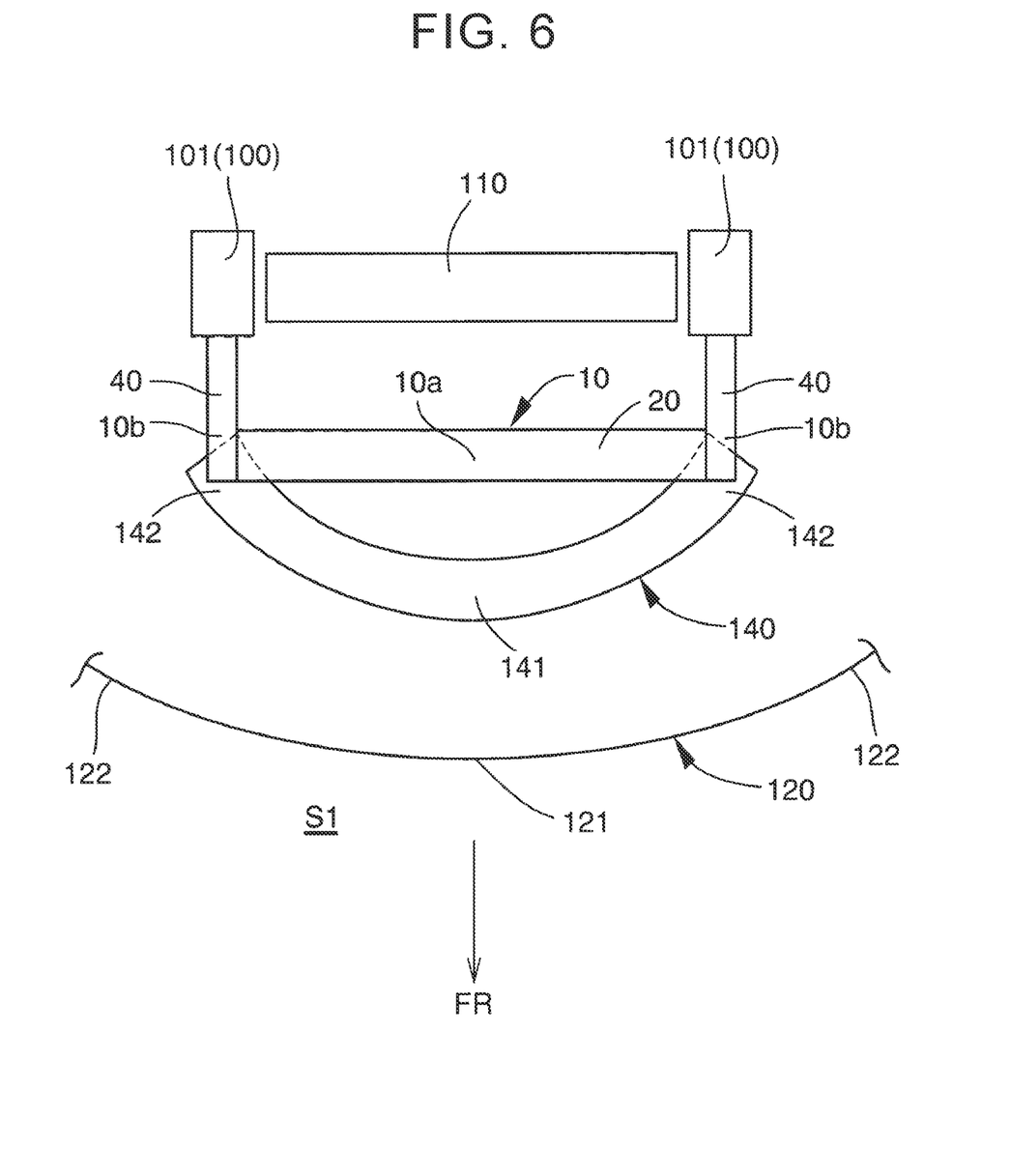
FIG. 6 is a schematic plan view showing a positional relation between the grille shutter according to the example of the disclosure and a second cross-member.

FIG. 6 shows a grille shutter 10 according to the example of the disclosure and its periphery. On a vehicle rear side of the grille shutter 10, a radiator 110 for cooling engine cooling water is arranged. The radiator 110 is supported by a metallic vehicle body 100. The vehicle body 100 has a pair of radiator support side members 101 that extends in a vehicle upper-lower direction. The radiator support side members 101 are provided on both outer sides of the radiator 110 in a vehicle right-left direction, respectively.

On a vehicle front side of the grille shutter 10, a front grille 120 is arranged, extending in the vehicle right-left direction. The front grille 120 is made from, for example, resin. A center portion 121 of the front grille 120 in the vehicle right-left direction is positioned on the vehicle front side with respect to both end portions 122 of the front grille 120 in the vehicle right-left direction, and, in a plan view, the center portion 121 has an almost arc shape that projects to the vehicle front side. A grille opening (not shown) is provided in the front grille 120, allowing air in an outer space S1 on the vehicle front side to pass through the grille opening. Air that has passed through the grille opening flows towards the radiator 110 through the grille shutter 10.

Figure 4:
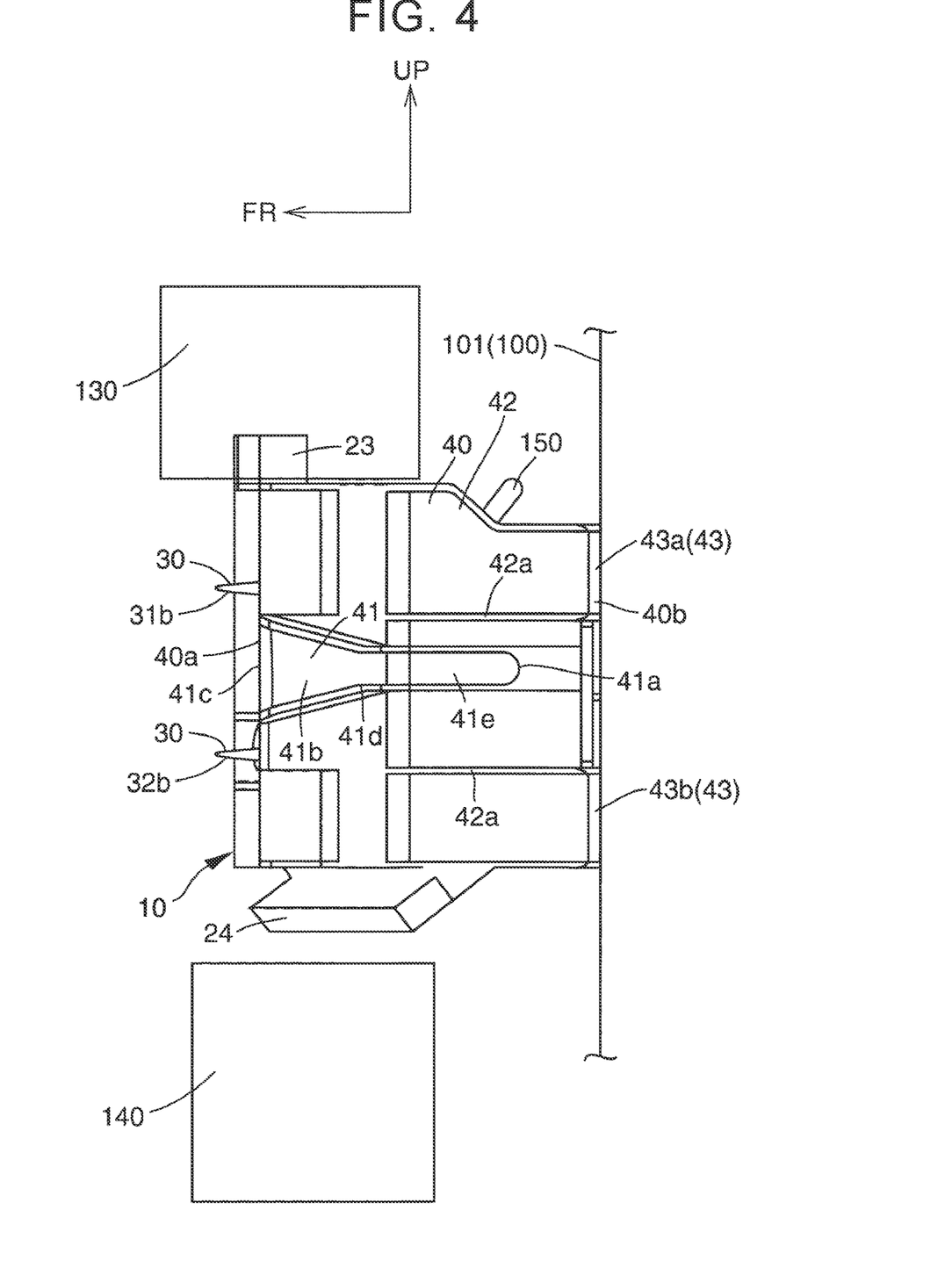
FIG. 4 is an enlarged side view of a part of the grille shutter according to the example of the disclosure.

As shown in FIG. 4, on a vehicle upper side of the grille shutter 10, a bumper reinforcement 130 is arranged, extending in the vehicle right-left direction. The bumper reinforcement 130 is made from metal. Similarly to the front grille 120, although not shown, a center portion of the bumper reinforcement 130 in the vehicle right-left direction is positioned on the vehicle front side with respect to both end portions of the bumper reinforcement 130 in the vehicle right-left direction, and, in a plan view, the center portion has an almost arc shape that projects to the vehicle front side.

Further, on a vehicle lower side of the grille shutter 10, a second cross-member (that may also be referred to as a lower bumper reinforcement) 140 is arranged, extending in the vehicle right-left direction. The second cross-member 140 is made from metal. As shown in FIG. 6, similarly to the front grille 120 and the bumper reinforcement 130, a center portion 141 of the second cross-member 140 in the vehicle right-left direction is positioned on the vehicle front side with respect to both end portions 142 of the second cross-member 140 in the vehicle right-left direction, and, in a plan view, the center portion 141 has an almost arc shape that projects to the vehicle front side.

Figure 1:
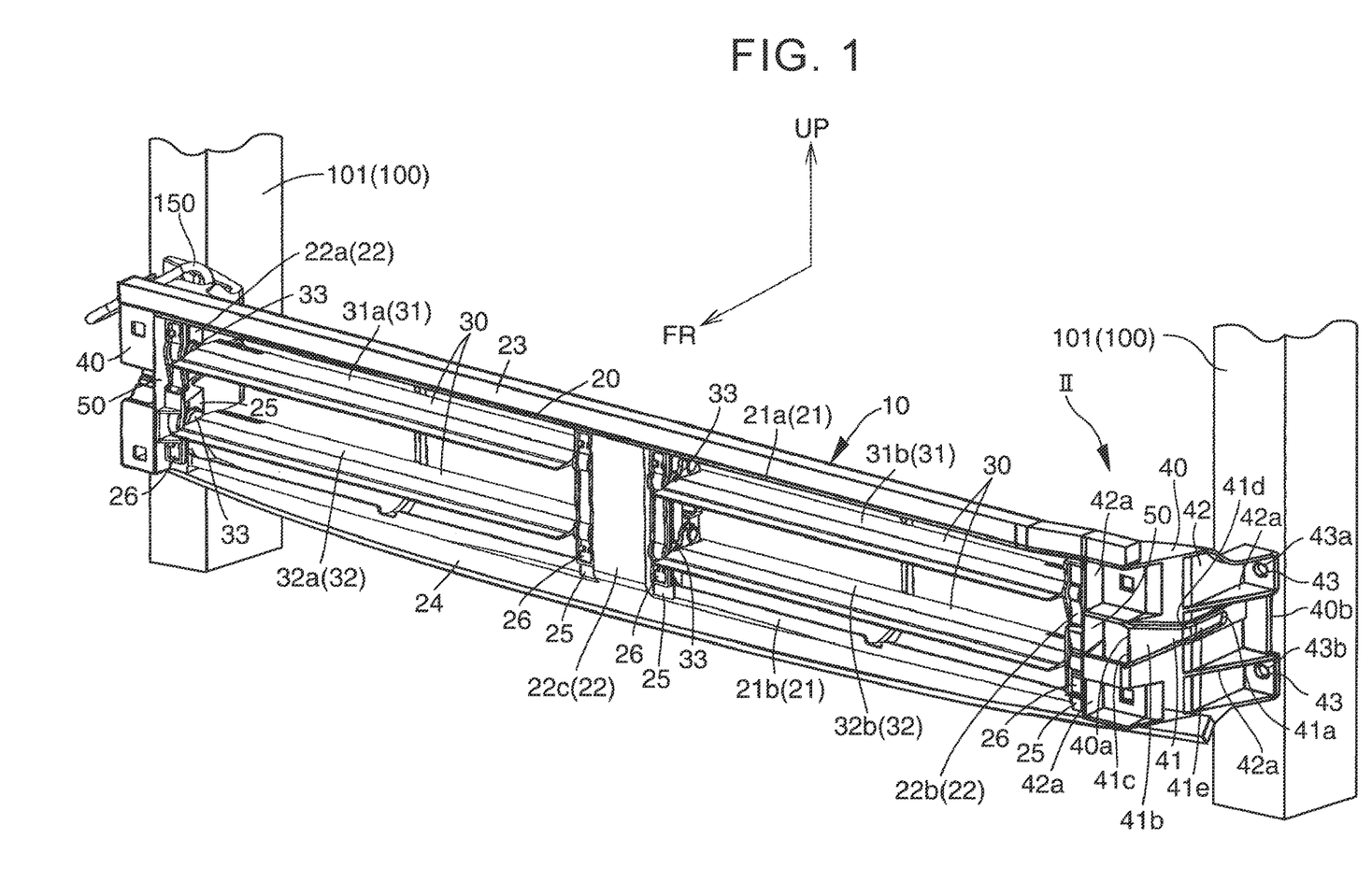
FIG. 1 is a perspective view of a grille shutter according to an example of the disclosure.

The grille shutter 10 is able to control an amount of air flowing to the radiator 110 through the grille opening of the front grille 120. The grille shutter 10 is provided, extending linearly or almost linearly in the vehicle right-left direction. As shown in FIG. 1, the grille shutter 10 includes a frame 20, fins 30 supported by the frame 20, and brackets 40.

The frame 20 is made from, for example, resin. The frame 20 has a frame shape longitudinally extending in the vehicle right-left direction in a view from the vehicle front side. The frame 20 includes lateral frames 21 that include an upper frame 21a and a lower frame 21b, and vertical frames 22 that include a right frame 22a, a left frame 22b, and a central frame 22c.

The upper frame 21a is provided in an upper end portion of the frame 20 and extends in the vehicle right-left direction. A sponge 23 serving as a seal member is provided between the upper frame 21a and the bumper reinforcement 130 provided above the upper frame 21a. The lower frame 21b is provided under the upper frame 21a and extends in the vehicle right-left direction. A sponge 24 serving as a seal member is provided between the lower frame 21b and the second cross-member 140 provided under the lower frame 21b. The right frame 22a connects end portions of the upper frame 21a and the lower frame 21b on the vehicle right side with each other, and is provided extending in the vehicle upper-lower direction. The left frame 22b connects end portions of the upper frame 21a and the lower frame 21b on the vehicle left side with each other, and is provided extending in the vehicle upper-lower direction. The central frame 22c connects center portions of the upper frame 21a and the lower frame 21b in the vehicle right-left direction with each other, and is provided extending in the vehicle upper-lower direction.

Each of the vertical frames 22 including the right frame 22a, the left frame 22b, and the central frame 22c has a frame body 25 and a frame cover 26 that is formed separately from the frame body 25 and attached to the frame body 25.

The fins 30 are made from, for example, resin. Each of the fins 30 has a plate shape, and is arranged on an inner side of the frame 20. Each of the fins 30 has shaft portions 33 in both end portions of each of the fins 30 in the vehicle right-left direction, and, as the shaft portions 33 are supported by the frame 20 so that the shaft portions 33 are able to rotate, each of the fins 30 is able to rotate about a rotating shaft center of the frame 20, the rotating shaft center extending in the vehicle right-left direction.

The fins 30 include upper fins 31 that include an upper right fin 31a and an upper left fin 31b, and lower fins 32 that include a lower right fin 32a and a lower left fin 32b. The number of each of the upper right fin 31a, the upper left fin 31b, the lower right fin 32a, and the lower left fin 32b provided may be only one, or more than one.

The upper right fin 31a is provided between the right frame 22a and the central frame 22c in the vehicle right-left direction, and is positioned higher in the vehicle upper-lower direction than a center of the frame 20 in the vehicle upper-lower direction. The upper left fin 31b is provided between the left frame 22b and the central frame 22c in the vehicle right-left direction, and is positioned higher in the vehicle upper-lower direction than the center of the frame 20 in the upper-lower direction. The lower right fin 32a is provided between the right frame 22a and the central frame 22c in the vehicle right-left direction, and is positioned lower in the vehicle upper-lower direction than the center of the frame 20 in the upper-lower direction. The lower left fin 32b is provided between the left frame 22b and the central frame 22c in the vehicle right-left direction, and is positioned lower in the vehicle upper-lower direction than the center of the frame 20 in the upper-lower direction.

The upper right fin 31a, the upper left fin 31b, the lower right fin 32a, and the lower left fin 32b can be rotated with respect to the frame 20 by power of an actuator (not shown) provided on the vehicle rear side or the like of the right frame 22a of the frame 20, and are moved in synchronization with each other by a link (not shown) provided on the vehicle rear side or the like of the central frame 22c of the frame 20. Therefore, when all of the upper right fin 31a, the upper left fin 31b, the lower right fin 32a, and the lower left fin 32b are rotated so as to become almost horizontal, the grille shutter 10 falls into an open state, and air is able to flow through the grille shutter 10 to the radiator 110. Meanwhile, when all of the upper right fin 31a, the upper left fin 31b, the lower right fin 32a, and the lower left fin 32b are rotated so as to become almost vertical, the grille shutter 10 falls into a closed state, and a flow of air that passes through the grille shutter 10 to the radiator 110 is blocked. In the drawings, a reference numeral 150 represents a harness that is connected with the actuator (not shown).

The brackets 40 are provided on both sides (both outer sides) of the frame 20 in the vehicle right-left direction, respectively. The brackets 40 are made from, for example, resin. Although the brackets 40 may be formed separately from the frame 20 and fixed and attached to the frame 20, in some embodiments, the brackets 40 may be formed integrally with the frame 20 in order to reduce the number of components. This means that the brackets 40 may be a part of the frame 20.

The brackets 40 are provided, extending to the vehicle rear side from both sides of the frame 20 in the vehicle right-left direction, respectively, and are joined (fastened) to the vehicle body 100 with bolts (not shown) or the like, respectively. Each of the brackets 40 includes a fragile portion 41, and a normal portion 42 that is a portion other than the fragile portion 41 and has higher rigidity than the fragile portion 41.

Figure 2:
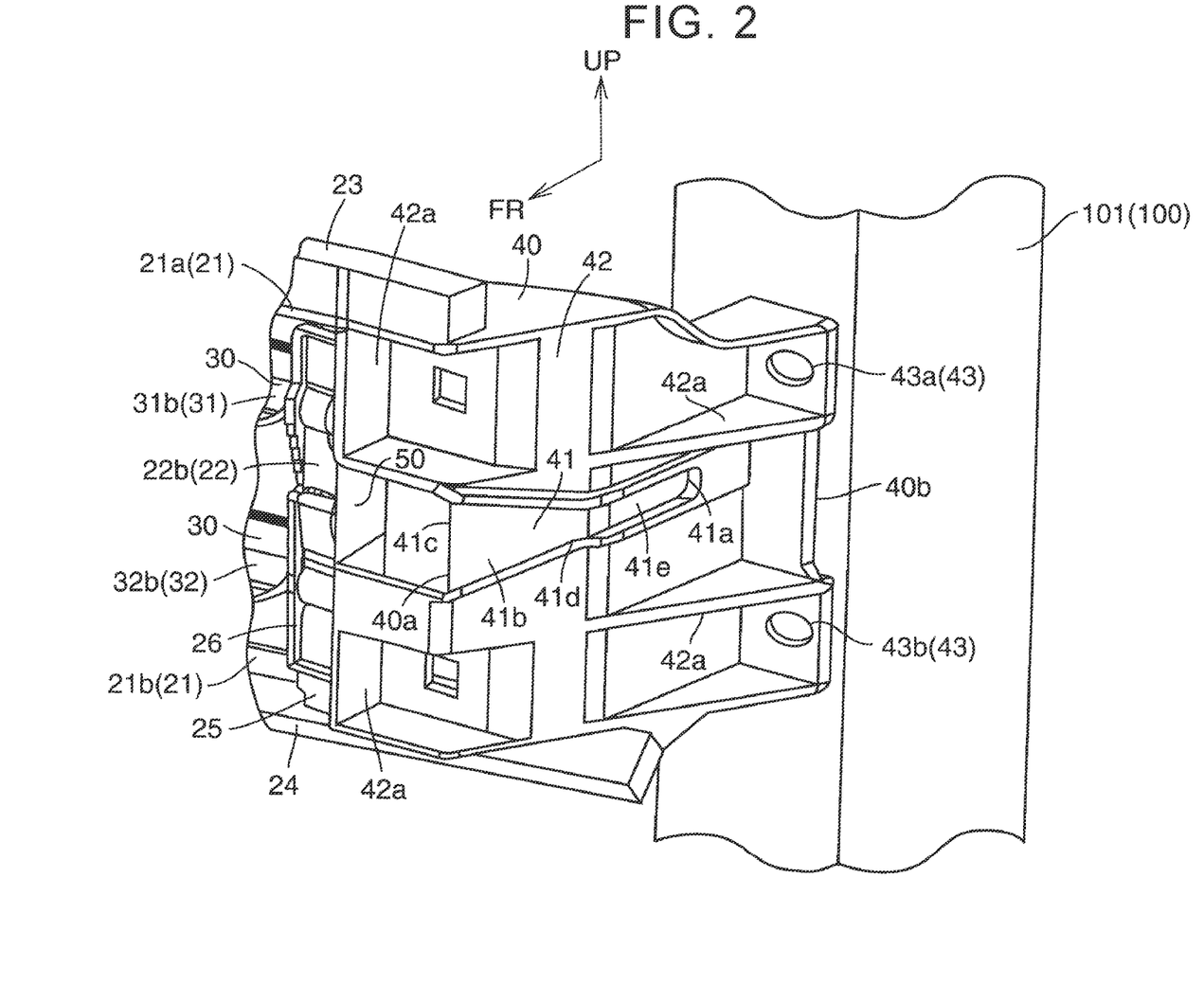
FIG. 2 is an enlarged view of a portion II in FIG. 1.

The fragile portion 41 is a portion where a thickness is smaller than that of the normal portion 42. As shown in FIG. 1 and FIG. 2, the fragile portion 41 is provided only in a part of the bracket 40. The fragile portion 41 is provided in a middle portion of the bracket 40 in the vehicle upper-lower direction. The fragile portion 41 is provided continuously from a middle portion through a front-side end 40a of the bracket 40 in the vehicle front-rear direction. A rear-side end 41a of the fragile portion 41 in the vehicle front-rear direction is positioned on the vehicle rear side of the center of the bracket 40 in the vehicle front-rear direction.

The fragile portion 41 has a widened portion 41b in which a length in the vehicle upper-lower direction becomes larger towards the vehicle front side. The widened portion 41b includes a front-side end 41c of the fragile portion 41 in the vehicle front-rear direction. Although the widened portion 41b may be provided in an entire fragile portion 41 in the vehicle front-rear direction, in some embodiments the widened portion 41b may be provided only from a middle portion 41d through the front-side end 41c of the fragile portion 41 in the vehicle front-rear direction. This is because it is possible to restrain rigidity of the bracket 40 from becoming too low due to the fragile portion 41 being provided. When the widened portion 41b is provided only from the middle portion 41d through the front-side end 41c of the fragile portion 41, the fragile portion 41 has a constant width portion 41e that extends to the vehicle rear side from the widened portion 41b and has a constant length in the upper-lower direction.

The normal portion 42 is a portion of the bracket 40 other than the fragile portion 41. The normal portion 42 has a larger thickness compared to that of the fragile portion 41, and thus has higher rigidity. The thickness of the normal portion 42 is 2.5 mm when the thickness of the fragile portion 41 is 1.0 mm. The normal portion 42 may further be provided with ribs 42a or the like in order to increase a difference in rigidity from that of the fragile portion 41.

The normal portion 42 is provided with the joining portion 43 that is joined to the vehicle body 100. The joining portion 43 is provided in a rear-side end portion 40b of the bracket 40 in the vehicle front-rear direction. The joining portion 43 includes an upper joining portion 43a and a lower joining portion 43b. The upper joining portion 43a is located on the vehicle upper side of the fragile portion 41, and the lower joining portion 43b is located on the vehicle lower side of the fragile portion 41.

As shown in FIG. 6, a center portion 10a of the grille shutter 10 in the vehicle right-left direction is located on the vehicle rear side of the center portion (not shown) of the bumper reinforcement 130 in the vehicle right-left direction, and the center portion 141 of the second cross-member 140 in the vehicle right-left direction, and the center portion 10a does not overlap in the vehicle upper-lower direction the center portion (not shown) of the bumper reinforcement 130 in the vehicle right-left direction and the center portion 141 of the second cross-member 140 in the vehicle right-left direction. Meanwhile, at least vehicle front side end portions of both end portions 10b of the grille shutter 10 in the vehicle right-left direction are located at the same positions as both end portions (not shown) of the bumper reinforcement 130 in the vehicle right-left direction and the both end portions 142 of the second cross-member 140 in the vehicle right-left direction, respectively, and the vehicle front side end portions of both end portions 10b overlap in the vehicle upper-lower direction the both end portions (not shown) of the bumper reinforcement 130 in the vehicle right-left direction and the both end portions 142 of the second cross-member 140 in the vehicle right-left direction, respectively. Therefore, as shown by an arrow Y in FIG. 5, when the second cross-member 140 is deformed to the vehicle upper side as the second cross-member 140 interferes with a road surface or the like while, for example, a vehicle is traveling on a bad road, there are instances where a load from the second cross-member 140 (an impact load from the vehicle lower direction) is applied to the both end portions 10b of the grille shutter 10 in the vehicle right-left direction.

Figure 5:
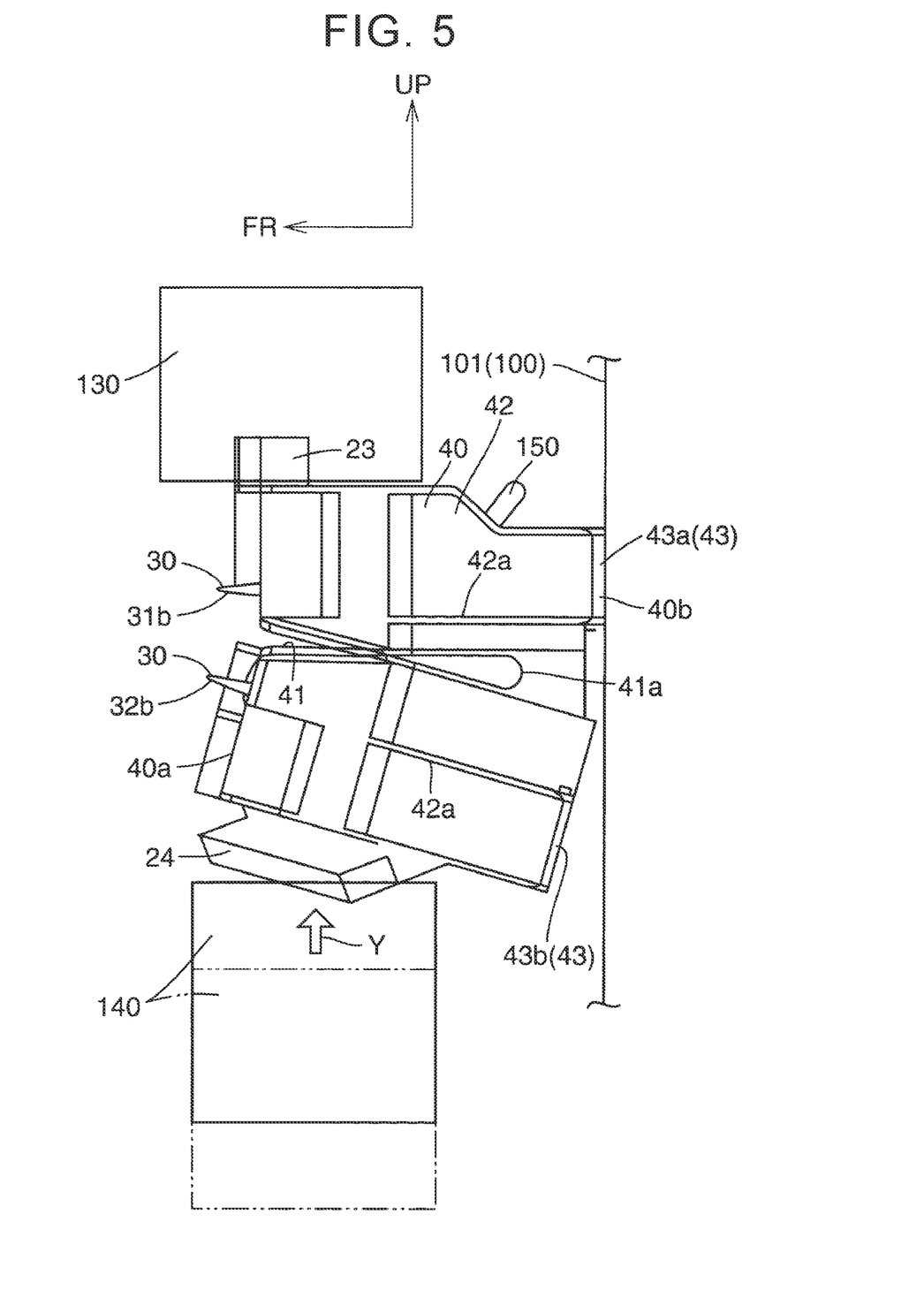
FIG. 5 is an enlarged side view of a part of the grille shutter according to the example of the disclosure when an impact load is applied to a bracket.

When the impact load from the vehicle lower direction is applied to the both end portions 10b of the grille shutter 10 in the vehicle right-left direction, the fragile portion 41 is plastically deformed (including damaged), and the bracket 40 breaks in a way that the front-side end 40a is lifted up.

Figure 3:
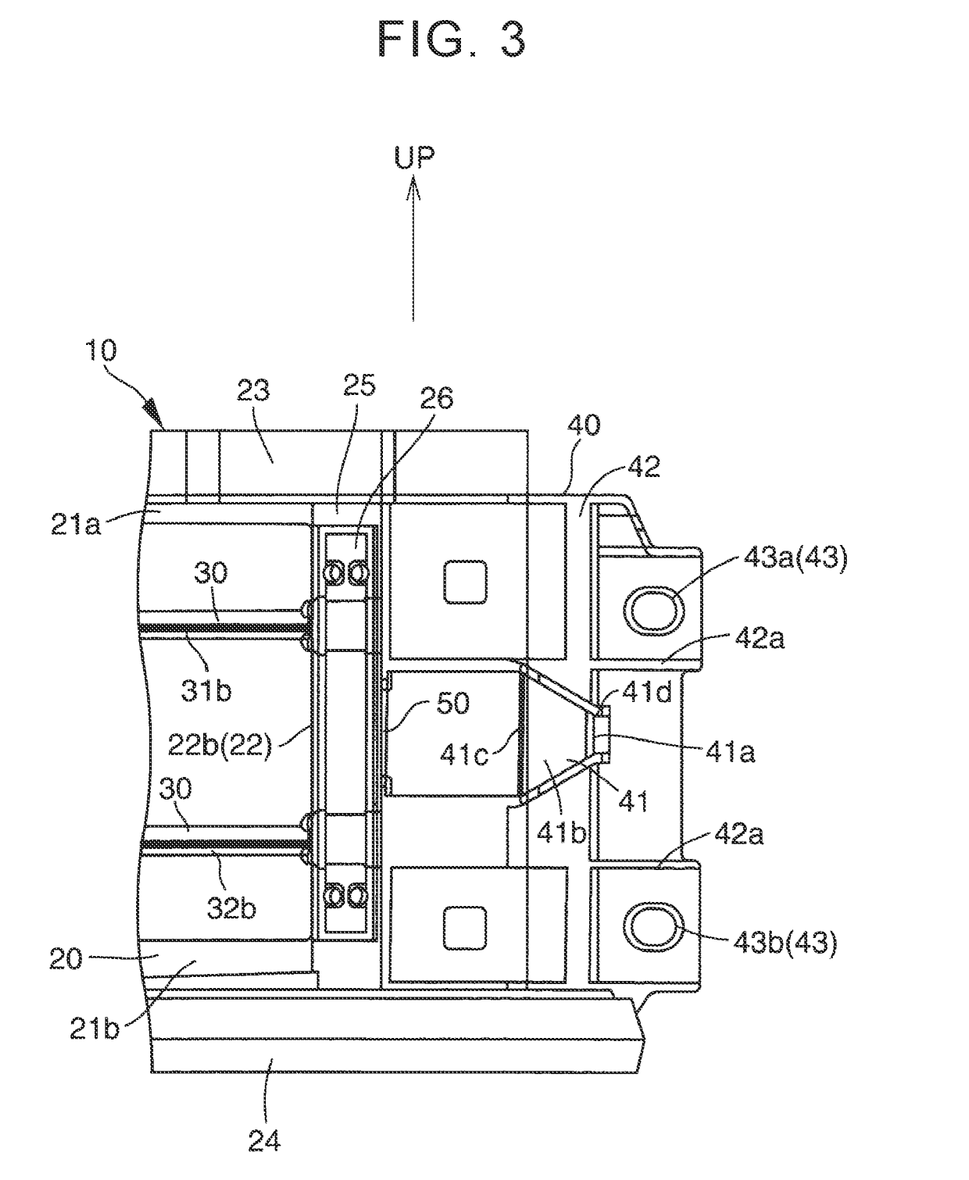
FIG. 3 is an enlarged front view of a part of the grille shutter according to the example of the disclosure.

As shown in FIG. 1 to FIG. 3, in a case where a standing wall 50 extending in the vehicle upper-lower direction and the vehicle front-rear direction is provided in the normal portion 42 of the bracket 40 at a position that overlaps the bumper reinforcement 130 and the second cross-member 140 in the vehicle upper-lower direction that is a position closer to a center in the vehicle right-left direction than the fragile portion 41, the standing wall 50 can stretch and hinder plastic deformation of the fragile portion 41. Therefore, in order to restrain this, in some embodiments, a thickness of the standing wall 50 is set to be as small as the thickness of the fragile portion 41.

In the example of the disclosure, the fragile portion 41 is a portion that has a thickness smaller than that of the normal portion 42. However, the disclosure is not limited to this. For example, the fragile portion 41 may be made from a different material with lower strength than that of the normal portion 42. Further, the fragile portion 41 only needs to have lower strength in the vehicle upper-lower direction than that of the normal portion 42, and strength in the vehicle front-rear direction of the fragile portion 41 may be the same as that of the normal portion 42. For example, the fragile portion 41 may be provided with a reinforcing member so that strength of the fragile portion 41 in the vehicle front-rear direction becomes the same as that of the normal portion. On the contrary, a reinforcing member for reinforcing strength of the normal portion 42 in the vehicle upper-lower direction may not be provided in the fragile portion 41. Also, strength of the fragile portion 41 may be lowered only in the vehicle upper-lower direction with use of a material such as wood having different strengths in different directions instead of the reinforcing member. Further, the fragile portion 41 may have a bellows-shape.

Next, effects of the example of the disclosure are described.

(A) Since the fragile portion 41 is provided in the bracket 40, when an impact load from the vehicle lower direction (an impact load from the second cross-member 140) is applied to the bracket 40 while, for example, a vehicle is traveling on a bad road, the fragile portion 41 is plastically deformed (including damaged). Thus, at least a part of the impact is absorbed. Therefore, an impact applied to the joining portion 43 of the bracket 40 to the vehicle body 100 is alleviated, and damage of the joining portion 43 is thus restrained. As a result, a joining state of the bracket 40 to the vehicle body 100 is maintained, and the grille shutter 10 is restrained from falling from the vehicle body 100.

(B) Since the joining state of the bracket 40 to the vehicle body 100 is maintained only by the fragile portion 41 being provided in the bracket 40, it is possible to maintain the joining state of the bracket 40 to the vehicle body 100 with a compact structure.

(C) The fragile portion 41 is present between the upper joining portion 43a and the lower joining portion 43b in the vehicle upper-lower direction. Therefore, as shown in FIG. 5, when an impact load is applied from the vehicle lower direction while, for example, a vehicle is traveling on a bad road, the impact acts directly on the lower joining portion 43b, and there is a possibility that the lower joining portion 43b is damaged. However, the upper joining portion 43a is restrained from being damaged because the impact applied to the upper joining portion 43a is alleviated as the fragile portion 41 is plastically deformed. Therefore, the joining state of the upper joining portion 43a to the vehicle body 100 is maintained, and it is thus possible to restrain the grille shutter 10 from falling down from the vehicle body 100.

(D) The upper joining portion 43a and the lower joining portion 43b are provided in the rear-side end portion 40b of the bracket 40 in the vehicle front-rear direction, and the fragile portion 41 is provided continuously from the middle portion through the front-side end 40a of the bracket 40 in the vehicle front-rear direction. Therefore, the following effects are obtained. (i) The plastic deformation of the fragile portion 41 can be generated in a location away from the upper joining portion 43a and the lower joining portion 43b. (ii) Compared to a case where the fragile portion 41 is provided only in the middle portion of the bracket 40 in the vehicle front-rear direction, the fragile portion 41 can be plastically deformed more easily when the impact load from the vehicle lower direction is applied to the bracket 40. (iii) Compared to a case where the fragile portion 41 is provided continuously in the entire region of the bracket 40 in the vehicle front-rear direction, it is possible to restrain rigidity of the bracket 40 from becoming too low due to the fragile portion 41 being provided. Therefore, plastic deformation of the fragile portion 41 is restrained when there is no impact load applied to the bracket 40 from the vehicle lower direction while, for example, a vehicle is traveling normally. (iv) When an impact load is applied from the vehicle lower direction, the bracket 40 can be deformed in a mode in which the bracket 40 is broken in a way that the front-side end 40a in the vehicle front-rear direction is lifted up. Therefore, it is possible to efficiently alleviate an impact applied to the upper joining portion 43a, and damage of the upper joining portion 43a is efficiently restrained.

(E) The rear-side end 41a of the fragile portion 41 in the vehicle front-rear direction is positioned on the vehicle rear side of the center of the bracket 40 in the vehicle front-rear direction. Therefore, compared to a case where the rear-side end 41a of the fragile portion 41 is positioned in the center of the bracket 40 in the vehicle front-rear direction or on the vehicle front side of the center, it is possible to make the fragile portion 41 longer in the vehicle front-rear direction. Thus, when an impact load is applied to the front-side end 41c of the fragile portion 41 from the vehicle lower direction, it is possible to increase the moment generated in the front-side end 41c of the fragile portion 41 about the rear-side end 41a of the fragile portion 41. Thus, when an impact load is applied from the vehicle lower direction, it is possible to efficiently obtain a deformation mode of the bracket 40 in which the bracket 40 is broken in a way that the front-side end 40a of the bracket 40 is lifted up.

(F) Since the fragile portion 41 has the widened portion 41b, it is possible to efficiently obtain the deformation mode of the bracket 40 in which the bracket 40 is broken in the way that the front-side end 40a of the bracket 40 is lifted up when an impact load is applied from the vehicle lower direction.

(G) Since the thickness of the fragile portion 41 is smaller than that of the portion of the bracket 40 other than the fragile portion 41 (the normal portion 42), it is possible to form the fragile portion 41 with a simple configuration. Further, with the simple configuration, plastic deformation is much more likely to happen in the fragile portion 41 than the normal portion 42.

(H) Since the bracket 40 is formed integrally with the frame 20, cost may be reduced as the number of components becomes smaller than that in a case where the bracket 40 is formed separately from the frame 20.

What is claimed is:

1. A grille shutter comprising:
a frame;
a fin supported by the frame; and
brackets that are arranged respectively on opposite sides of the frame in a vehicle right-left direction, and are used for attaching the frame to a vehicle body, each of the brackets being partially provided with a fragile portion,
wherein the grille shutter is provided in front of a radiator and the grille shutter is coupled to radiator support side members.

2. The grille shutter according to claim 1, wherein:
the fragile portion is provided in a middle portion of a corresponding bracket in a vehicle upper-lower direction;
each of the brackets includes a joining portion that is joined to the vehicle body; and
the joining portion includes an upper joining portion provided above the fragile portion, and a lower joining portion provided below the fragile portion.

3. The grille shutter according to claim 2, wherein:
the upper joining portion and the lower joining portion are provided in a rear-side end portion of the corresponding bracket in a vehicle front-rear direction; and
the fragile portion is provided continuously from a middle portion through a front-side end of the corresponding bracket in the vehicle front-rear direction.

4. The grille shutter according to claim 3, wherein a rear-side end of the fragile portion in the vehicle front-rear direction is positioned rearward of a center of the corresponding bracket in the vehicle front-rear direction.

5. The grille shutter according to claim 3, wherein:
the fragile portion includes a widened portion in which a length in the vehicle upper-lower direction increases towards a front side in the vehicle front-rear direction; and
the widened portion is provided by including a front-side end of the fragile portion in the vehicle front-rear direction.

6. The grille shutter according to claim 1, wherein:
each of the brackets is provided with a normal portion; and
a thickness of the fragile portion is smaller than a thickness of the normal portion.

7. The grille shutter according to claim 1, wherein each of the brackets is formed integrally with the frame.

8. The grille shutter according to claim 1, wherein:
each of the brackets is provided with a normal portion; and
the fragile portion has lower strength in a vehicle upper-lower direction compared to strength of the normal portion.

9. The grille shutter according to claim 1, wherein:
each of the brackets includes a joining portion that is joined to the vehicle body; and
the joining portion is provided above the fragile portion.

10. The grille shutter according to claim 1, wherein:
each of the brackets is provided with a normal portion; and
a material used for the fragile portion has lower strength in a vehicle upper-lower direction than strength of a material used for the normal portion.

11. The grille shutter according to claim 1, wherein the fragile portion is configured so as to be plastically deformed when an impact is applied from below in a vehicle upper-lower direction.

12. The grille shutter according to claim 4, wherein:
the fragile portion includes a widened portion in which a length in the vehicle upper-lower direction increases towards a front side in the vehicle front-rear direction; and
the widened portion is provided by including a front-side end of the fragile portion in the vehicle front-rear direction.

13. The grille shutter according to claim 1, wherein each of the brackets is provided with a normal portion and a thickness of the fragile portion is smaller than a thickness of the normal portion.

14. A grille shutter comprising:
a frame;
a fin supported by the frame; and
brackets that are arranged respectively on opposite sides of the frame in a vehicle right-left direction, and are used for attaching the frame to a vehicle body, each of the brackets being partially provided with a fragile portion, each of the brackets is provided with a normal portion, and a material used for the fragile portion has lower strength in a vehicle upper-lower direction than strength of a material used for the normal portion.

15. The grille shutter according to claim 14, wherein:
the fragile portion is provided in a middle portion of a corresponding bracket in a vehicle upper-lower direction;

each of the brackets includes a joining portion that is joined to the vehicle body; and the joining portion includes an upper joining portion provided above the fragile portion, and a lower joining portion provided below the fragile portion.

16. The grille shutter according to claim 15, wherein:

the upper joining portion and the lower joining portion are provided in a rear-side end portion of the corresponding bracket in a vehicle front-rear direction; and the fragile portion is provided continuously from a middle portion through a front-side end of the corresponding bracket in the vehicle front-rear direction.

17. The grille shutter according to claim 16, wherein a rear-side end of the fragile portion in the vehicle front-rear direction is positioned rearward of a center of the corresponding bracket in the vehicle front-rear direction.

18. A grille shutter comprising:

a frame;

a fin supported by the frame; and brackets that are arranged respectively on opposite sides of the frame in a vehicle right-left direction, and are used for attaching the frame to a vehicle body, each of the brackets being partially provided with a fragile portion, the fragile portion is configured so as to be plastically deformed when an impact is applied from below in a vehicle upper-lower direction.

19. The grille shutter according to claim 18, wherein:

the fragile portion is provided in a middle portion of a corresponding bracket in a vehicle upper-lower direction;

each of the brackets includes a joining portion that is joined to the vehicle body; and the joining portion includes an upper joining portion provided above the fragile portion, and a lower joining portion provided below the fragile portion.

20. The grille shutter according to claim 19, wherein:

the upper joining portion and the lower joining portion are provided in a rear-side end portion of the corresponding bracket in a vehicle front-rear direction; and the fragile portion is provided continuously from a middle portion through a front-side end of the corresponding bracket in the vehicle front-rear direction.

* * * * *